Patented May 22, 1934

1,959,547

UNITED STATES PATENT OFFICE 1,959,547

PROCESS OF EXTRACTING ACETIC ACID FROM PYROLIGNEOUS SUBSTANCES

Eloi Ricard and Henri Martin Guinot, Melle, France, assignors, by mesne assignments, to Société Anonyme: Usines De Melle, Melle, France, a company of France No Drawing. Original application July 19, 1929, Serial No. 379,575. Divided and this application September 2, 1931, Serial No. 560,771. In Belgium January 25, 1929

5 Claims. (Cl. 260—122)

The extraction of acetic acid in pure state from aqueous solutions has already been accomplished very advantageously by utilizing judiciously chosen solvents and acting methodically on the aqueous solutions containing the acid substantially free from other organic materials. But this mode of operation is not directly applicable to pyroligneous acid which contains, in addition to acetic acid, numerous impurities susceptible of passing into solution in the extracting solvent and consequently capable of opposing the regeneration thereof in a pure state.

The obtaining of acetic acid known as "good taste" totally free from tars, from pyroligneous substances has not up to the present been industrially possible, save with repeated distillations, which, in addition to the high consumption of steam, entail very considerable losses in acetic acid because of the waste caused by these various operations and from the fact that a part of the acid remains retained in the residuary tars. Finally, the output in acetic acid with "good taste" is mediocre as the production of about 20% of acid strongly polluted with tars known as "bad taste" acid can not be avoided.

It has been proposed to extract the tars by a suitable solvent, as in the French Patent No. 506,281, dated January 31, 1918, but one is confronted with the difficulty that no solvent extracts practically the whole of the tars. Consequently the acid obtained is not the good taste acid, and one is obliged to return to the process involving successive distillation, which again gives bad taste. On the other hand, the major portion of the solvents extract simultaneously with the tars a certain quantity of acid, which, if it is not decided to discard it, gives by regeneration bad taste. In fact this method at the present time has no industrial application.

It has been proposed with greater success, instead of seeking to extract the tars from the pyroligneous substances, to extract the acetic acid, either from the pyroligneous liquor, or from pyroligneous vapors, the tars remaining in the residuum of the operation.

But there again the solvent employed always becomes charged with a certain quantity of tars, which either necessitates costly regeneration or results in the production of bad tastes, depending upon how much more volatile the solvent is than the acetic acid.

In our copending application Serial No. 379,575, filed July 19, 1929, (now Patent No. 1,884,241 dated October 25, 1932) of which this application is a division, we have described and claimed a process which consists in removing as a first step, by means of a suitable solvent, which is a good solvent for tars but a bad solvent for acetic acid, all the tars which would be susceptible, in the second operation, of being dissolved in the second solvent, which is chosen so that it is a good solvent for acetic acid and leaves in the residuary water the tars which were insoluble in the two solvents.

We have discovered that, instead of two different solvents, we can also utilize only a single solvent for the two successive operations of the process.

In fact, it has been found that certain solvents possess solvent properties which are extremely unequal with respect to the acetic acid on the one hand and to the tars on the other. If we consider, for example, amyl acetate and if we take as unity the volume of the pyroligneous solution to be treated, it is found that for extracting the tars it is sufficient to use about 0.25 volume, whereas for extracting the acetic acid it is necessary to employ about four volumes. The quantities of solvents to be used in the two operations, supposedly carried out by methodic washings, are therefore in the ratio of 1:16 with respect to each other.

It results that the volume of the solvent which will be polluted with tars and which will consequently be regenerated does not represent more than a seventeenth part of the volume of the total solvents employed in the two operations.

It will, therefore, be seen that the economy in steam will be considerable with respect to that which would have been necessary had direct extraction been resorted to, in a single operation, of the acetic acid by the same solvent instead of practising the two operations successively.

We have noted in a general way that the esters of the acetic acid act with very unequal solvent properties with respect to the tars on the one hand and the acetic acid on the other, but we have been able to employ also with success ketones either fatty, as mesityl oxide, butyrone and others, or the carbocyclic ketones such as cyclohexanones and others.

The mixtures of these solvents between themselves or with other solvents can be very advantageous in the treatment of certain pyroligneous substances thus, a mixture of an ester of acetic acid and a ketone constitute a solvent useful for this process.

We do not depart from the spirit of the invention if instead of operating with pyroligneous solutions we treat the pyroligneous substances in a vapor state. Neither do we depart from the spirit of the invention if we operate either entirely or in part under pressure other than atmospheric pressure.

The following example, which is in no way limitative, will show a manner in which our invention may be carried out.

Let a pyroligneous liquor having a content per liter of 150 gr. of acid and 56 gr. of tar be detarred. We may use as a solvent ethyl acetate.

1st step: Ethyl acetate is caused to circulate according to the counter-current principle through the pyroligneous liquor, in any suitable extraction apparatus, in the proportions of 1 volume of ethyl acetate to 4 volumes of pyroligneous liquor. Upon issuing out of the extraction apparatus, the solvent (ethyl acetate) is found to contain per liter 142 gr. of tar and 125 gr. of acetic acid. The pyroligneous liquor is found to contain still 68.4 gr. of acid per liter but no remainder of tar which would be liable to pollute a fresh charge of ethyl acetate.

2d. step: The pyroligneous liquor detarred is now treated by means of a fresh charge of ethyl acetate (by systematic exhaustion in any suitable extraction apparatus, for instance as set forth in our copending application Serial No. 197,763, filed June 9, 1927, now Patent No. 1,860,553 dated May 31, 1932), so as to give a concentrated mixture of acetic acid, ethyl acetate and a small amount of water (the proportion of ethyl acetate to the pyroligneous liquor is much larger than in the first step). This mixture may, if desired, be subsequently concentrated or dehydrated, for instance by the process claimed in Patent No. 1,860,553, dated May 31, 1932.

As to the solvent charged with tar and acetic acid, obtained in the first step, it is treated as follows:

Ethyl acetate is expelled through distillation and recovered to serve in a subsequent operation. There remains a mixture of acetic acid and tar. Acetic acid is expelled by being carried off with vapor of a hydrocarbon, for instance a petroleum essence suitably chosen boiling between 94° and 104° C.

We claim:

1. A process of extracting acetic acid from pyroligneous substances which comprises first extracting said pyroligneous substances with a solvent capable of dissolving the major portion of troublesome impurities therein composed of tars, in a quantity equal to a small fraction of the volume of the said pyroligneous substances, said solvent also being capable of extracting acetic acid therefrom and the solvent properties of said solvent being greater with respect to the tars than to the acetic acid, and subsequently subjecting the said pyroligneous substances to a deacidification treatment by utilizing a quantity of the same solvent greater than two times the volume utilized in the first operation.

2. A process of extracting acetic acid from pyroligneous substances as set forth in claim 1, wherein the solvent consists of a mixture of solvents.

3. A process of extracting acetic acid from pyroligneous substances as set forth in claim 1, wherein the extraction of the pyroligneous substances to remove tars and the subsequent deacidification treatment are performed with ketones.

4. A process of extracting acetic acid from pyroligneous substances as set forth in claim 1, wherein the extraction of the pyroligneous substances to remove tars and the subsequent deacidification treatment are performed with esters of acetic acid.

5. A process of extracting acetic acid from pyroligneous substances as set forth in claim 1, wherein the extraction of the pyroligneous substances to remove tars and the subsequent deacidification treatment are performed with a mixture of esters of acetic acid and ketones.

ELOI RICARD.
HENRI MARTIN GUINOT